United States Patent
Lehman et al.

(10) Patent No.: US 7,272,020 B2
(45) Date of Patent: Sep. 18, 2007

(54) ISOLATED, CURRENT-FED, PULSE WIDTH MODULATION, DC-DC CONVERTER

(75) Inventors: Bradley M. Lehman, Belmont, MA (US); Wei Song, Boston, MA (US)

(73) Assignee: Northeastern University, Boston, MA (US)

( * ) Notice: Subject to any disclaimer, the term of this patent is extended or adjusted under 35 U.S.C. 154(b) by 293 days.

(21) Appl. No.: 11/063,248

(22) Filed: Feb. 22, 2005

(65) Prior Publication Data

US 2005/0195622 A1    Sep. 8, 2005

Related U.S. Application Data

(60) Provisional application No. 60/546,719, filed on Feb. 20, 2004.

(51) Int. Cl.
*G05F 3/335* (2006.01)
(52) U.S. Cl. .......................... 363/17; 363/132
(58) Field of Classification Search .................. 363/17, 363/132
See application file for complete search history.

(56) References Cited

U.S. PATENT DOCUMENTS

| | | | | |
|---|---|---|---|---|
| 4,201,957 A | * | 5/1980 | Cathell | 331/110 |
| 4,519,022 A | * | 5/1985 | Glennon | 363/41 |
| 4,566,059 A | * | 1/1986 | Gallios et al. | 363/17 |
| 4,594,650 A | * | 6/1986 | Kinbara | 363/56.05 |
| 5,202,820 A | * | 4/1993 | Miller et al. | 363/56.02 |
| 5,422,765 A | * | 6/1995 | Kobayashi et al. | 363/40 |
| 5,673,188 A | * | 9/1997 | Lusher et al. | 363/132 |
| 5,875,103 A | * | 2/1999 | Bhagwat et al. | 363/17 |
| 5,880,944 A | * | 3/1999 | Hickman | 363/65 |
| 5,946,208 A | * | 8/1999 | Yamamoto et al. | 363/132 |
| 6,016,258 A | * | 1/2000 | Jain et al. | 363/17 |
| 6,995,987 B2 | * | 2/2006 | Song et al. | 363/17 |

OTHER PUBLICATIONS

Zhu et al., "New Start-up Schemes for Isolated Full-Bridge Boost Converters," in Proc. IEEE Appl. Power Electron. Conf. 2000, pp. 309-313.

Yakushev et al., "Full-Bridge Isolated Current Fed Converter with Active Clamp," in Proc. IEEE Appl. Power Electron Conf., 1999 pp. 560-566.

(Continued)

*Primary Examiner*—Jeffrey Sterrett
(74) *Attorney, Agent, or Firm*—Weingarten, Schurgin, Gagnebin & Lebovici LLP

(57) ABSTRACT

A current-fed DC-DC converter has a topology that improves converter performance and operates an input inductor in continuous conduction mode. The configuration and operation of the converter produces reduced requirements for circuit component ratings and leads to faster transient response time than conventional current-fed DC-DC converters. The converter can operate as an apparent current-fed full bridge converter in one stage, and an apparent current-fed half bridge converter in another stage. The input inductor is configured and operated to release stored energy to the load in conjunction with other energy storage components to provide a continuous output current that significantly reduces output voltage ripple, leading to reduced rating requirements and output components. The converter topology permits a portion of the switching stage to operate with no deadtime to further improve circuit responsiveness and efficiency.

18 Claims, 12 Drawing Sheets

OTHER PUBLICATIONS

Barbosa et al., "A Single-Switch Flyback-Current-Fed DC-DC Converter," IEEE Trans. Power Electron, vol. 13. No. 3, 1998 pp. 466-475.

Borgatti et al., "IkW, 9 kV DC-DC Converter Module with Time-Sharing Control of Output Voltage and Input Current," IEEE Trans. Power Electron., vol. 8, No. 4, 1993, pp. 606-614.

Tenti et al., "Single-Stage Current-Fed DC/DC Converter with Time-Sharing Control of Output Voltage and Input Current," IEEE Trans. Power Electron., vol. 5, No. 4, 1990, pp. 389-397.

Barbosa et al., "A Single-Switch Flyback Current-Fed DC-DC Converter," IEEE Trans. Power Electron, vol. 13, No. 3, 1998, pp. 466-475.

Mantovanelli et al., "A New Current-Fed, Isolated PWM DC-DC Converter," IEEE Trans. Power Electron, vol. 11, No. 3, 1996, pp. 431-438.

Song et al., "Dual-Bridge DC-DC Converter: A New Topology of No Deadtime DC-DC Converters," in Proc. IEEE Appl. Power Electron Conf., 2002, pp. 1133-1139.

* cited by examiner

ISOLATED, CURRENT-FED, PULSE WIDTH MODULATION, DC-DC CONVERTER

CROSS REFERENCE TO RELATED APPLICATIONS

This application claims priority from U.S. Provisional Patent Application Ser. No. 60/546,719, filed Feb. 20, 2004, entitled ISOLATED CURRENT-FED PWM DDC-DC CONVERTER WITH SMALL INDUCTANCE AND NO DEADTIME OPERATION, the whole of which is incorporated herein.

STATEMENT REGARDING FEDERALLY SPONSORED RESEARCH OR DEVELOPMENT

N/A

BACKGROUND OF THE INVENTION

1. Field of the Invention

The present invention relates generally to PWM driven DC-DC converters, and relates more particularly to a current-fed isolated PWM DC-DC converter with reduced inductance and no deadtime.

2. Description of Related Art

Current-fed DC-DC converters have recently seen a resurgence in the number of applications in which they are used. In general, the term "current-fed" in an isolated DC-DC converter refers to the fact that the filter inductor of the converter is on the primary side. The voltage and current of the primary winding of the transformer in the DC-DC converter are determined by the load voltage and the source impedance, for example, the inductance of the primary side inductor. Current-fed topologies obtain noticeable advantages including immunity from transformer flux imbalance and a lack of an output inductor, which makes the current-fed topology useful for multi-output applications. Typical examples of isolated current-fed DC-DC converter topologies include current-fed full bridge topologies, fly back-current-fed push-pull converters, and their derivations.

One difficulty with conventional current-fed DC-DC converters is that the energy provided from the input DC source to the load is discontinuous over the entire operating period. In part of an operating period, the energy to the load is solely provided by the output capacitor. Accordingly, a larger inductor is often used in the current-fed DC-DC converter, and power densities are not necessarily optimal. A conventional current-fed full bridge DC-DC converter is illustrated in FIG. 1. The secondary side of transformer T, which provides the output of the converter, includes an output capacitor Co, which is appropriately sized and rated to handle the output voltage ripple. Output capacitor Co typically supplies energy to the load during discontinuous intervals of operation. Accordingly, capacitor Co has a relatively large rating, but less than optimal power density.

Conventional current-fed DC-DC converters driven by PWM signals have a deadtime interval. The term deadtime is defined to mean the time duration in an operating period that is used to obtain a regulated output voltage. During the deadtime, the energy transmission from an input DC source to an output load is not continuous and only provided, for example, by the output capacitor.

It would be desirable to obtain a current-fed DC-DC converter with reduced requirements for component ratings, while improving power density and avoiding deadtime inefficiencies.

BRIEF SUMMARY OF THE INVENTION

In accordance with the present invention, there is provided a current-fed DC-DC converter with an input inductor that operates in continuous conduction mode (CCM) to obtain reduced operational requirements for circuit components. The reduced rating requirements for circuit components leads to faster transient response time, reduced size circuits and reduced overall cost for the DC-DC converter. The topology of the present invention permits the converter to switch its apparent operation between a current-fed full bridge converter and a current-fed half bridge converter. When operating as an apparent half bridge converter, the inductor releases stored energy to the load, and the converter has an input-to-voltage transfer ratio that is similar to a voltage-fed topology. The converter can take advantage of a simple self-driven synchronous rectification and a 50% duty cycle to provide a continuous voltage across a secondary winding of a transformer connected to the switching portion of the DC-DC converter. The continuous voltage on the secondary side of the transformer permits the output filter rating to be reduced due to the significantly reduced ripple in the output.

According to a feature of the present invention, the topology and operation of the circuit according to the present invention produces less stress on the switches of the switching stage of the DC-DC converter. Accordingly, switches with potentially lower ratings may be used to realize the DC-DC converter of the present convention.

According to a feature of the present invention, a bi-directional switch is coupled to the full bridge switching circuit to permit bi-directional energy flow from/to storage components.

According to another feature of the present invention, one or more inductors is incorporated into the switching full bridge to permit the on times of certain full bridge switches to overlap, without shoot through cross conduction. In addition, the overlapping on time of certain switches in the switching full bridge avoids discontinuous operation of the inductor to prevent high voltage spikes on the inductor or the switches.

According to an advantage of the present invention, an inductor coupled to a switching full bridge operates in continuous conduction mode to improve power density, reduce component rating requirements, and provide a continuous output that reduces the demands for ripple ratings on the input and output components.

Other features and advantage of the present invention will become apparent from the following detailed description of the invention taken in conjunction with the accompanying drawings.

DETAILED DESCRIPTION OF THE INVENTION

The present invention provides an isolated current-fed PWM DC-DC converter with a small inductance and no deadtime operation. In comparison to conventional current-fed DC-DC converters, the present invention reduces the inductance by a factor of 3.5 times. The reduction in inductance also produces a faster transient response time. The converter of the present invention can also provide an output stage with a simple self-driven synchronous rectification and a more continuous upward voltage, permitting a smaller rated output filter capacitance, while reducing the voltage stress on the power switches in the switching stage.

Operation of the converter according to the present invention provides an appearance of a current-fed full bridge converter in one stage and a current-fed half bridge in another stage. When operating in the current-fed half bridge stage, an inductor releases and sends stored energy to the load, together with energy supplied from a DC source. The input to output voltage transfer ratio of the converter according to the present invention is similar to that of a voltage-fed topology and provides some of the same advantages. While the inductor is operated in continuous conduction mode (CCM), the energy from the input DC source to the load is continuous over the entire operating period, except for the switching transient intervals, which are negligible in comparison to the operating period.

Figure 1:
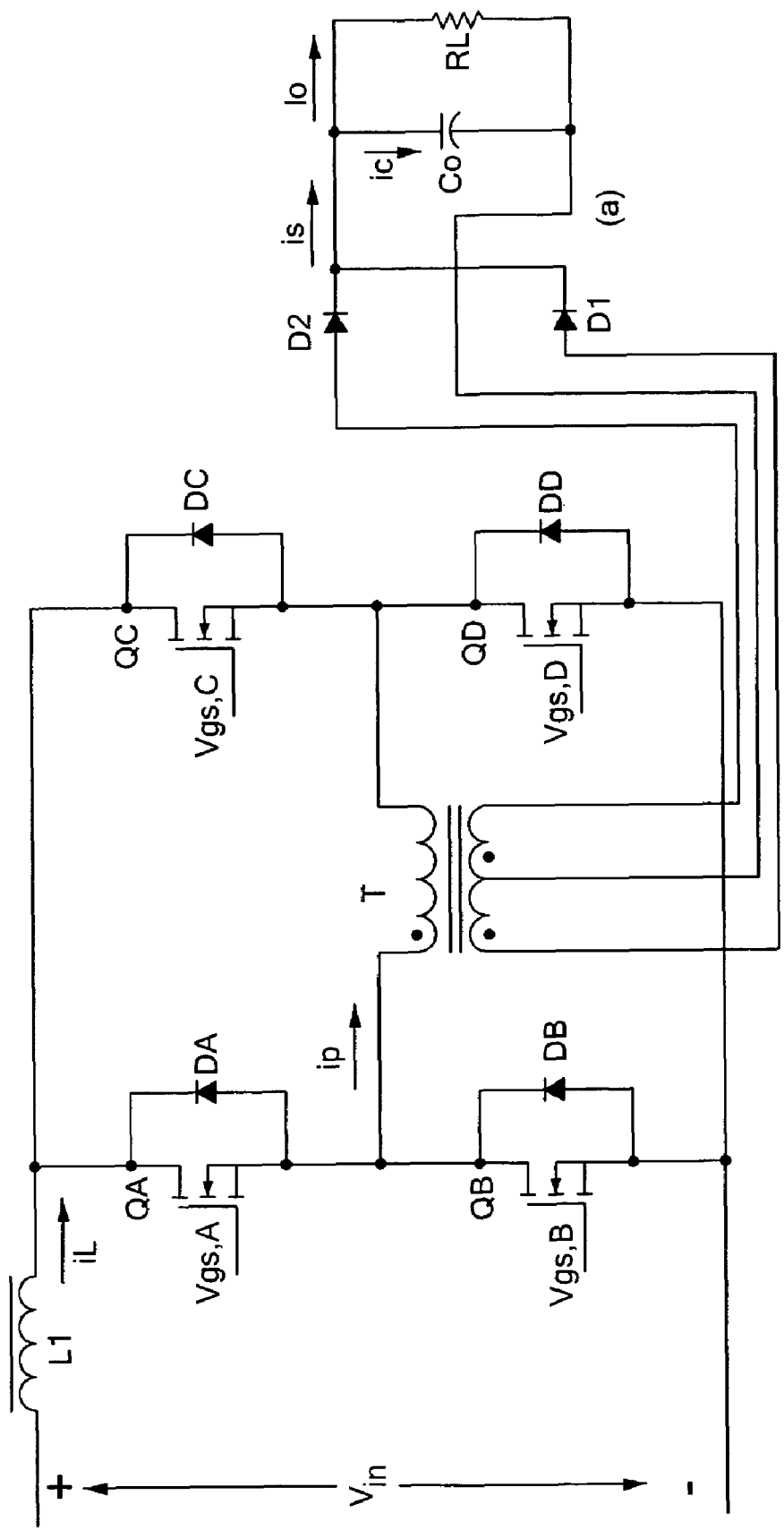
FIG. 1 is a circuit diagram of a conventional current-fed DC-DC converter.
Figure 2:
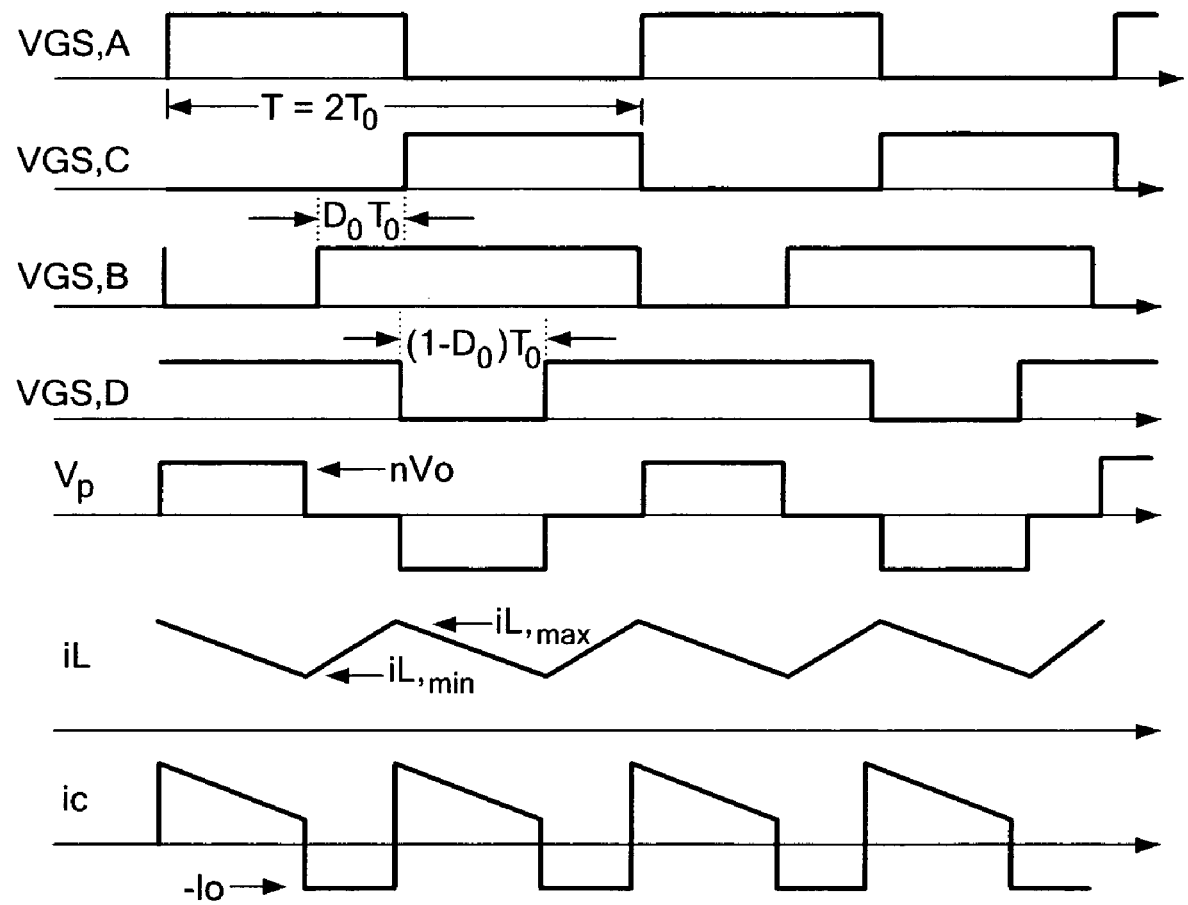
FIG. 2 is a timing diagram showing idealized waveforms for a current-fed DC-DC converter.
Figure 3:
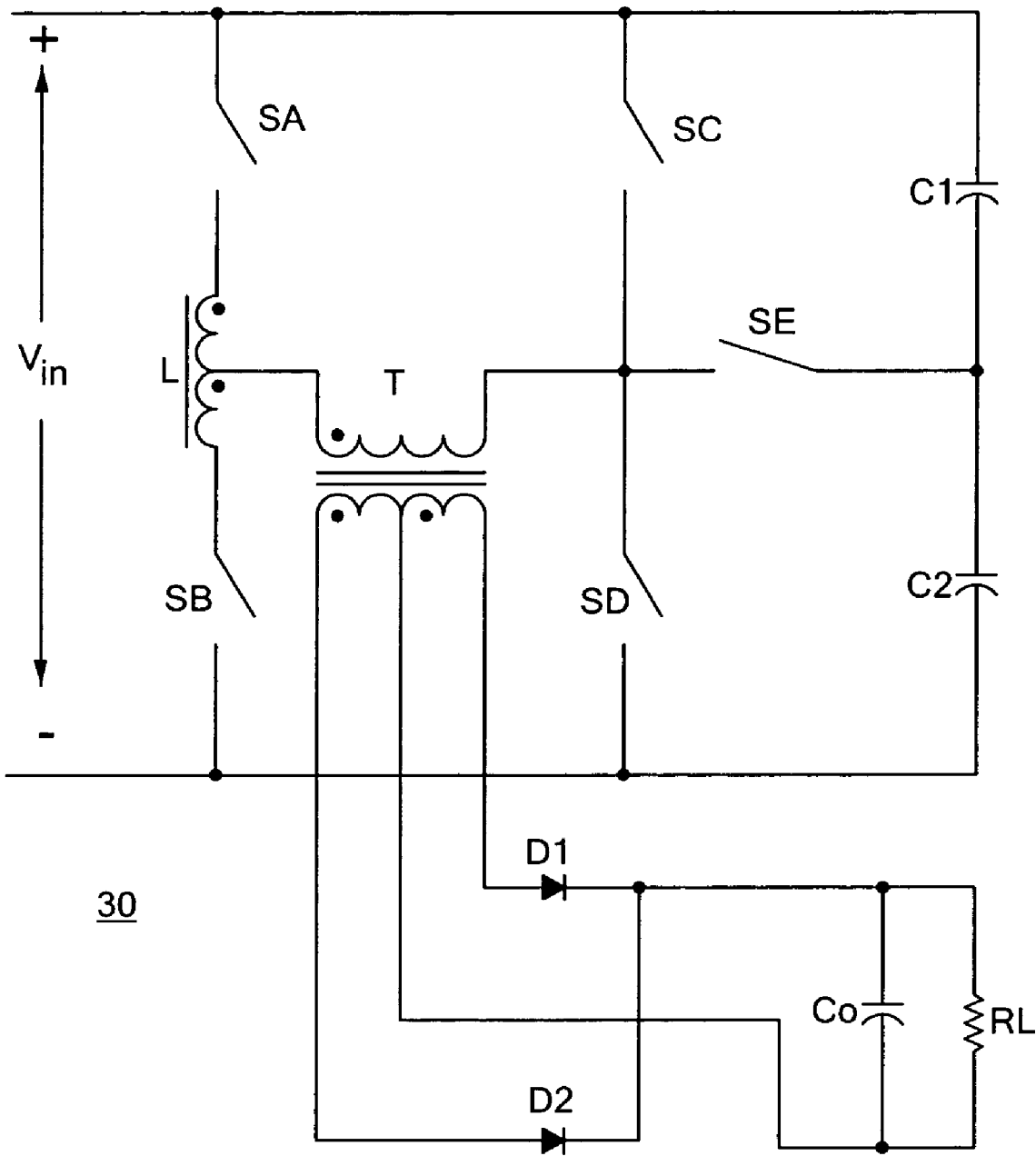
FIG. 3 is a circuit schematic illustrating an embodiment of the present invention.

Referring to FIG. 3, a circuit 30 illustrating the configuration of the converter according to the present invention is shown. Circuit 30 features an inductor L coupled between two of the switches in the switching stage, SA and SB. Due to the presence of inductor L between switches SA and SB, switches SA and SB can be switched on at the same time without incurring a short circuit condition. Switches SA and SB are on at the same time during the switching transition to permit inductor L to operate in a continuous mode so that there is no instantaneous change in current through inductor L, which would otherwise lead to high voltage spikes and potential damage or failure of switches SA and SB.

One particular advantage derived from the topology illustrated in circuit diagram 30 of FIG. 3 is a reduction in inductance for inductor L. The inductance of inductor L can be reduced by approximately 3.5 times over that of a conventional current-fed converter, which also improves the transient response speed of circuit 30 by approximately 3.5 times, with all other circuit specifications being approximately equal. Due to the continuous current conduction in inductor L, a simple self-driven synchronous rectification can be used with the no deadtime operation and a duty ratio of approximately 50% to provide a continuous voltage on the secondary winding of transformer T. Accordingly, the input-output voltage transfer ratio of circuit 30 has a linear duty ratio, similar to a buck-like topology. This transfer ratio is different from conventional current-fed topologies, which typically have boost or buck-boost transfer characteristics and an RHP zero.

Due to the increased regularity of the load current, a substantial reduction in the output filter capacitance can be achieved in comparison to conventional current-fed topologies. This reduction is permitted because the load current is maintained by transferred energy in addition to the output capacitor supply during portions of the output cycle where the current would otherwise be discontinuous. That is, the converter topology permits the contribution of energy to the load so that the output capacitor is not solely responsible for load current during discontinuous intervals as in conventional current-fed topologies. The current ripple of the output is thus significantly reduced according to the present invention, especially when compared to fly back current-fed push-pull topologies.

The configuration of the switching stage on the primary side of transformer T permits a lower voltage stress on the primary side power switches SA-SD, since the voltage is not greater than the maximum input voltage. An additional switch SE connects a capacitor half bridge composed of capacitor C1 and C2 to the switching full bridge stage. Switch SE permits recycling of stored energy in circuit 30 to provide bi-directional power flow in the primary side of transformer T to further improve power density in the converter according to the present invention. As shown in circuit 30, inductor L is connected to the primary side of transformer T through a center tap. Switches SA-SD, inductor L and transformer T operate to provide a current-fed full bridge converter during the full bridge operational stage. Switches SA and SB, inductor L, transformer T and capacitors C1 and C2 provide a current-fed half bridge converter during the half bridge operational stage. Switch SE controls energy transfer in circuit 30 between capacitors C1, C2 and transformer T, and is accordingly a bi-directional switch.

Figure 4:
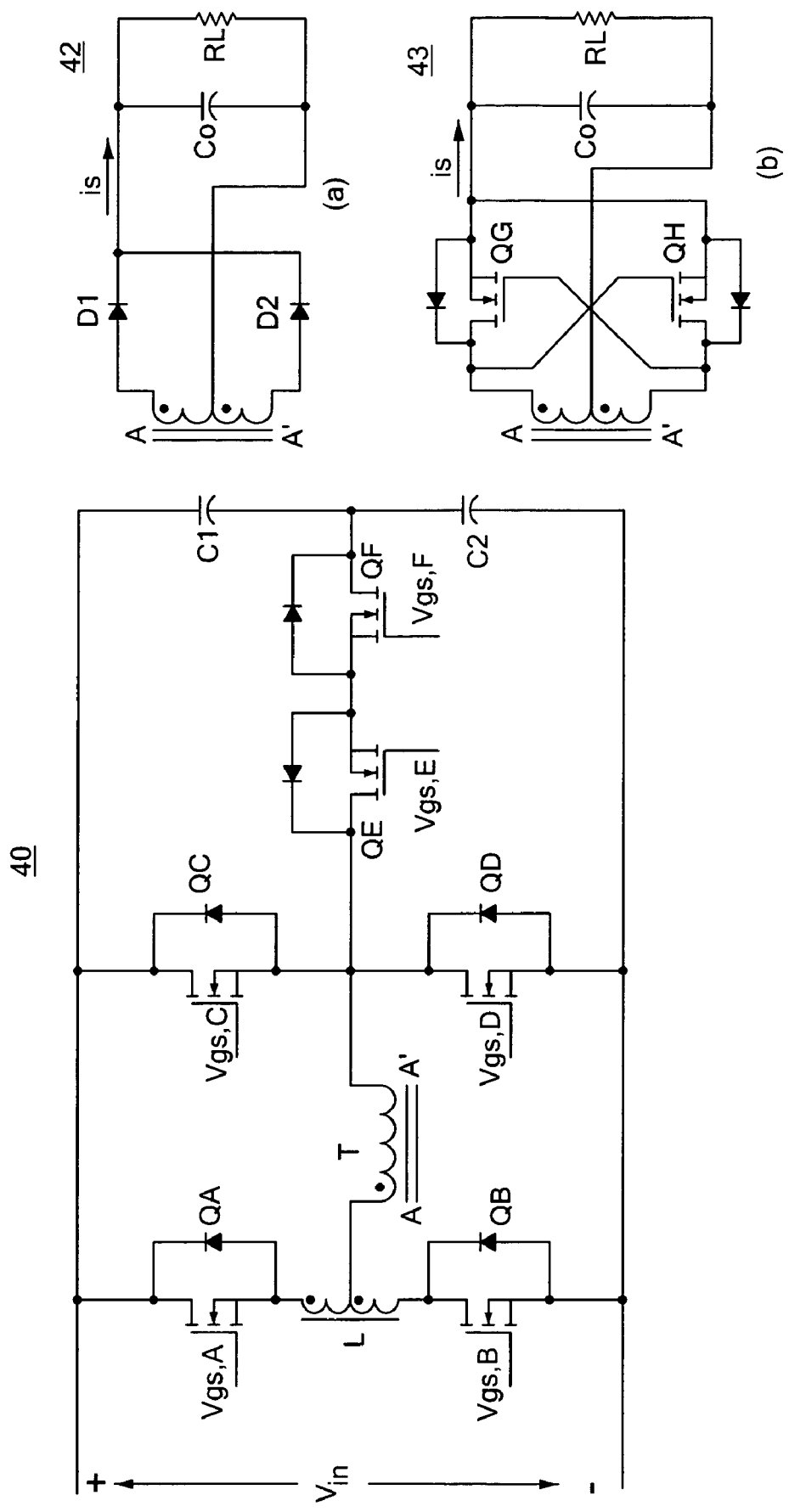
FIG. 4 is a circuit schematic illustrating an implementation of the embodiment of FIG. 3.
Figure 5:
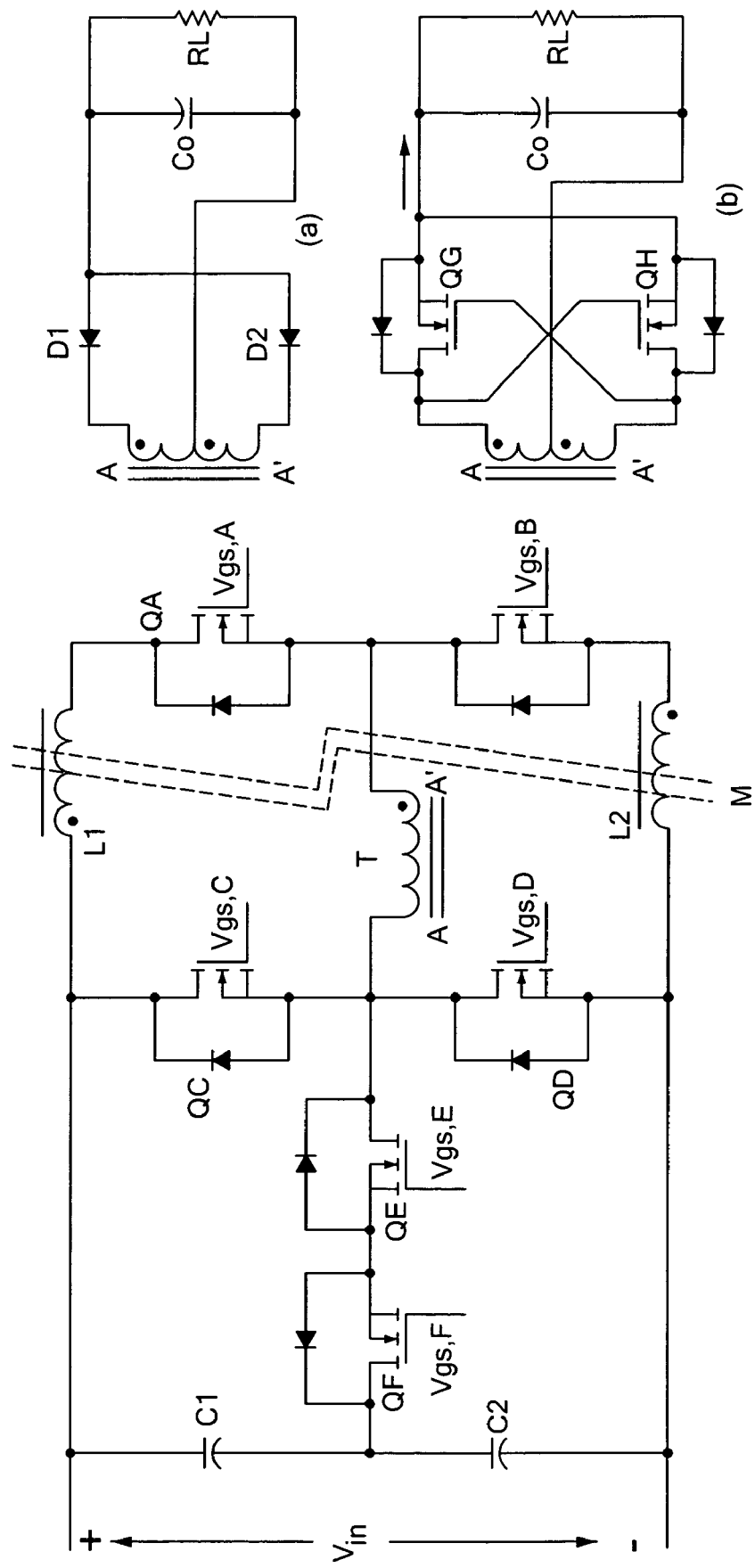
FIG. 5 is a circuit diagram illustrating another embodiment of the present invention.

Referring now to FIG. 4, a diagram of circuit 40 illustrates a practical implementation of circuit 30 of FIG. 3. Circuit 40 includes two possible output stage configurations on the secondary side of transformer T, circuits 42 and 43. Secondary side circuit 42 obtains a full wave rectification with diodes D1 and D2. Circuit 43 obtains a full wave rectification of the output signal with self-driven synchronous rectification MOSFETS QG and QH. A number of different secondary side output circuit configurations are available, and the present invention is described with respect to a given circuit topology in conjunction with output circuit 43. It should be apparent that a number of different output circuits on the secondary side of a DC-DC converter according to the present invention may be used, and the invention is not to be so limited.

In circuit 40, inductor L is coupled to transformer T through a center tap, with the dotted end connected to switch QA. Switch SE in circuit 30 of FIG. 3 is realized in circuit 40 with two MOSFETS QE and QF in a series connection. The series connected MOSFETS QE and QF implement a bi-directional switch for providing bi-directional power flow in circuit 40. The operation of circuit 40 is described as follows.

Switches QA and QB in circuit 40 are switched with complimentary 50% duty cycle square waves, with the phase of the square waves adjusted so that the conduction time of the two switches slightly overlaps. The simultaneous conduction of switches QA and QB prevents the occurrence of an open circuit state across inductor L. An open circuit state on inductor L would cause very high voltage spikes to occur across switches QA and QB, potentially causing damage or failure to switches QA and QB.

Figure 6:
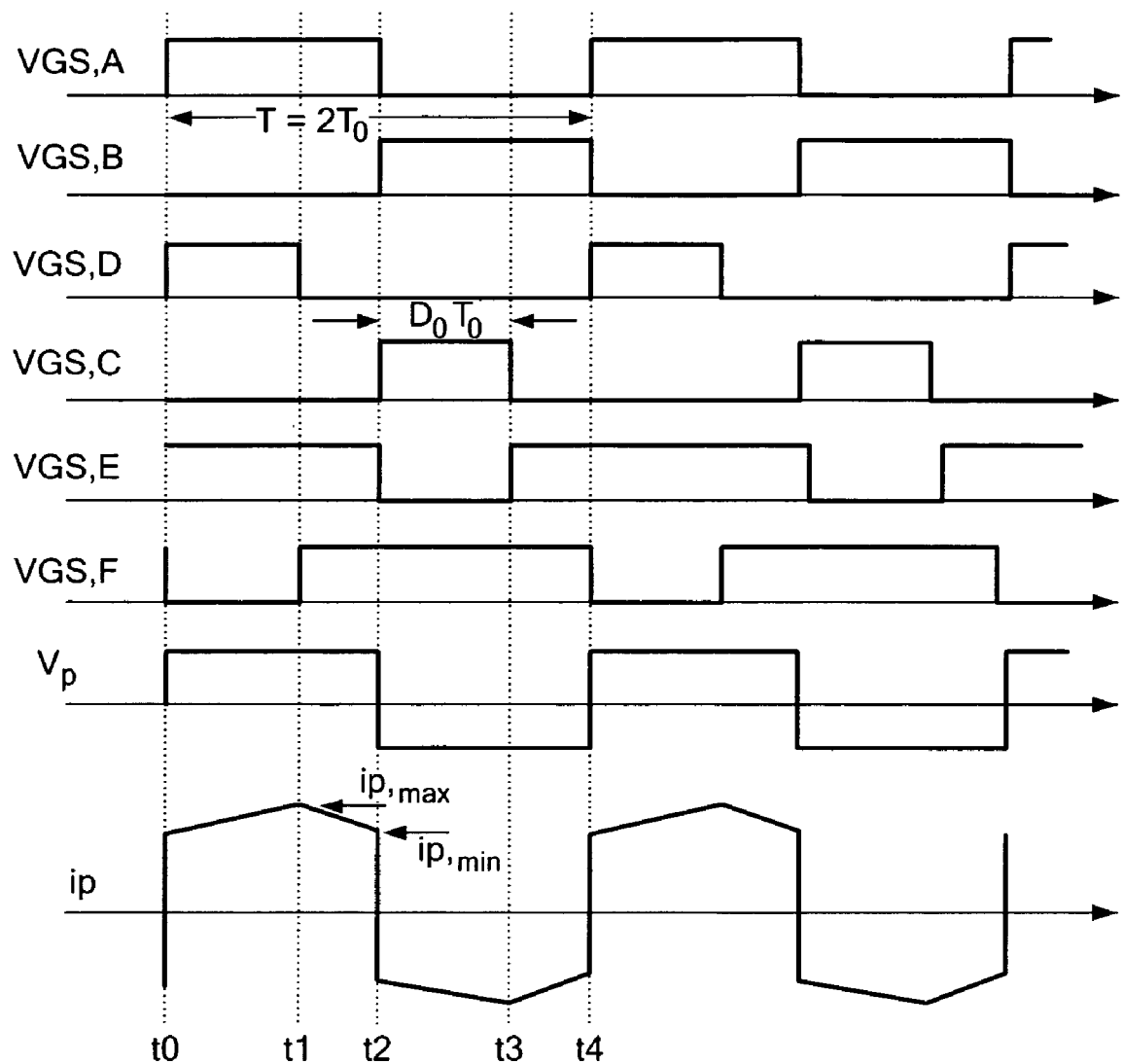
FIG. 6 is a timing diagram illustrating idealized waveforms for the current-fed DC-DC converter according to the present invention.

One assumption of operation for circuit 40 is that inductor L will operate in continuous conduction mode. Under this assumption, a number of ideal waveforms can be derived for steady state operation, as illustrated in FIG. 6. The various parameters used in describing the operation of circuit 40 are: n, the ratio of primary to secondary windings in transformer T, Vp=nVo, the voltage across the primary winding; Vo, the output voltage of the converter; Vin, the input DC voltage; and Io, the output load current. The operation of each of the switches in circuit 40 during different time intervals is illustrated in FIGS. 7A-7D.

Figure 7A:
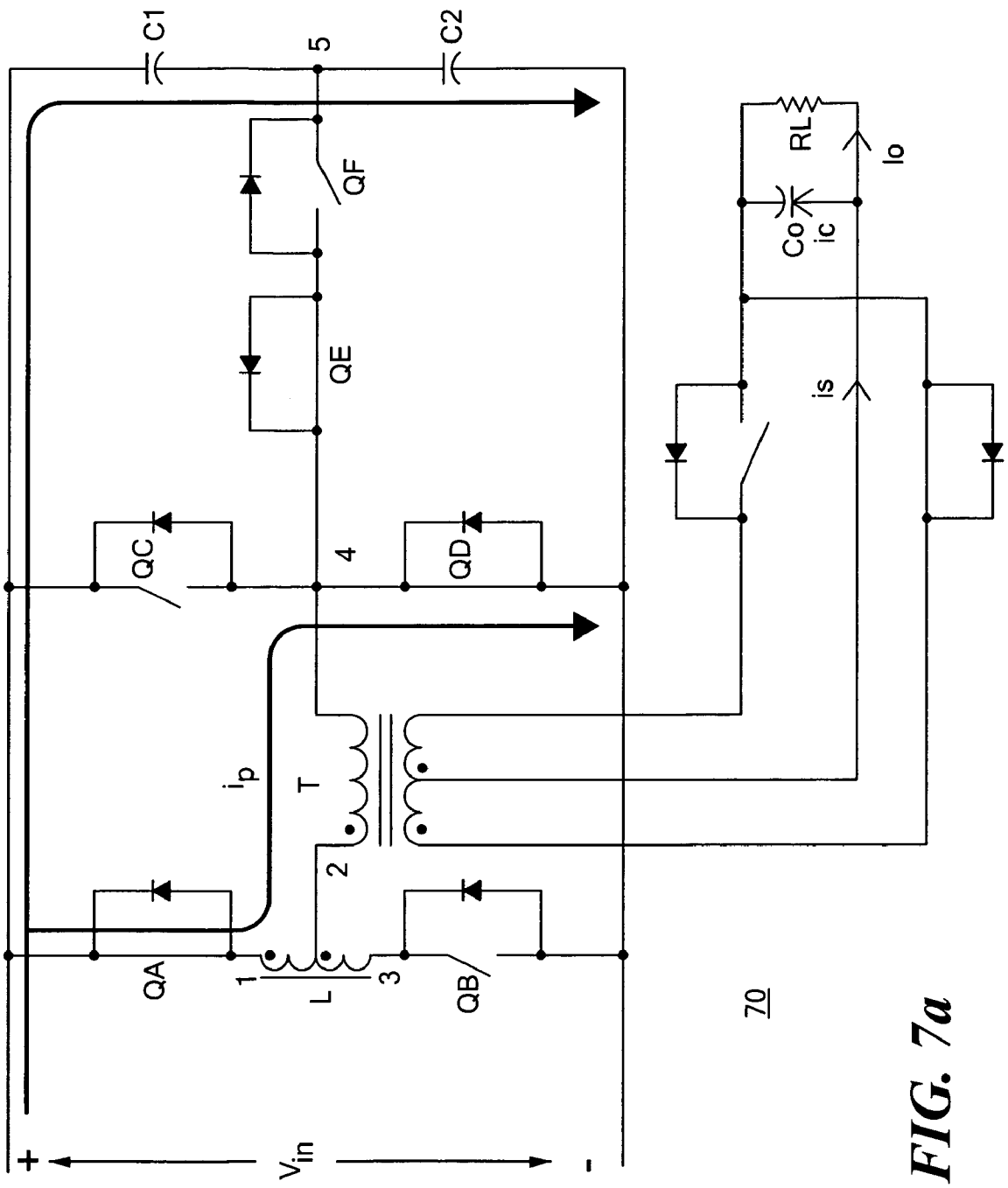
FIGS. 7A-7D are circuit diagrams illustrating states of operation of an embodiment of the DC-DC converter according to the present invention.
Figure 7B:
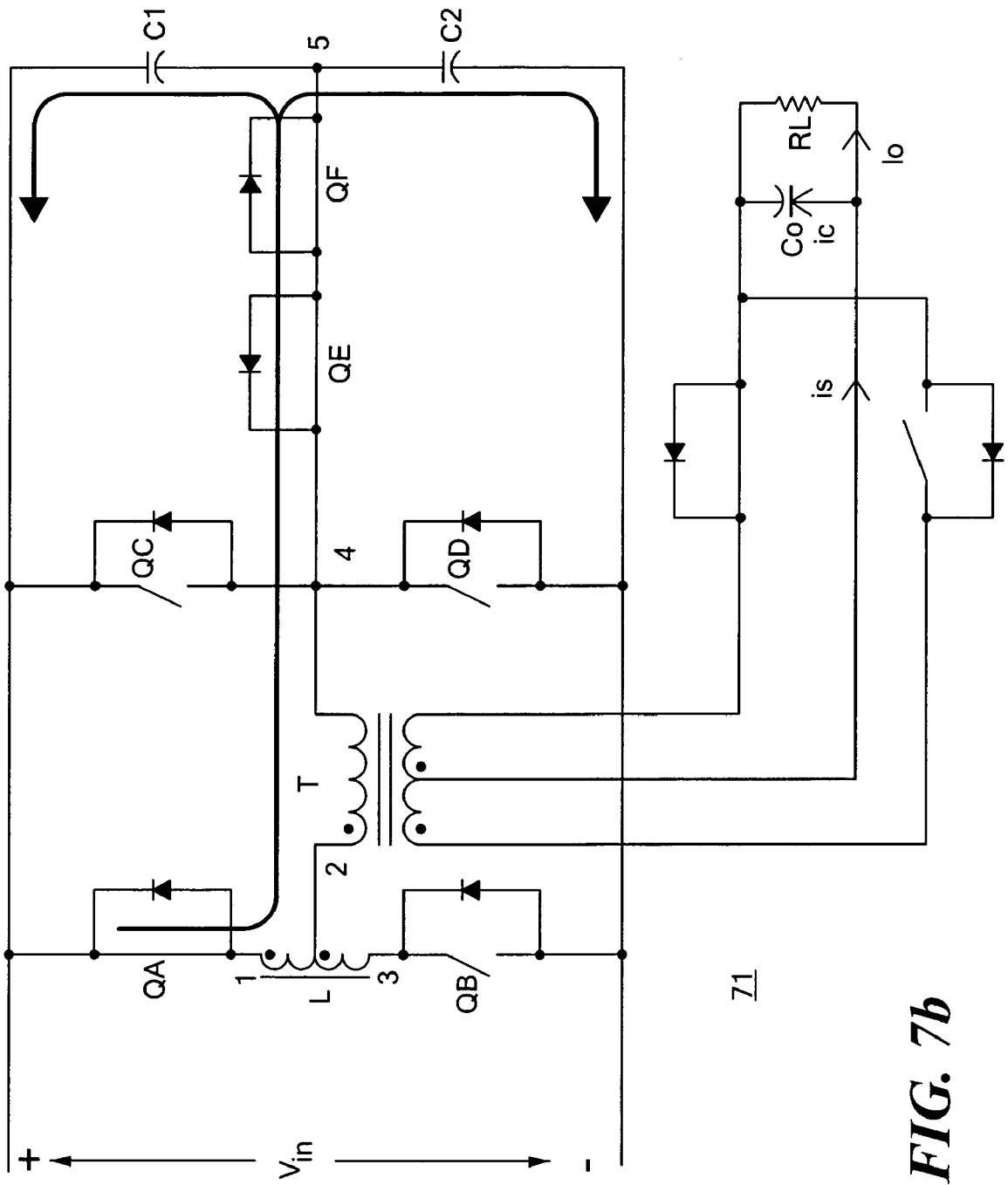
Figure 7C:
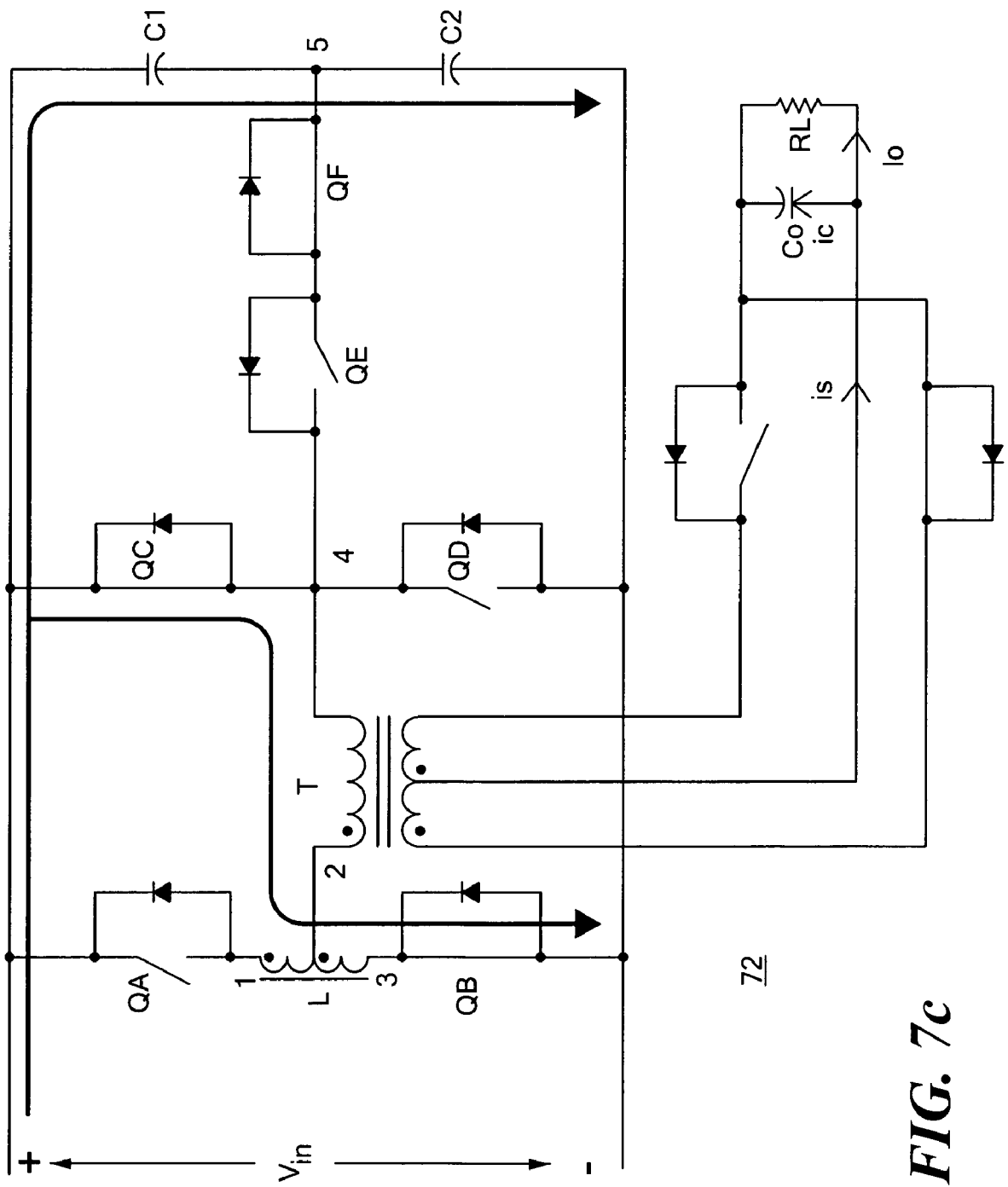

Referring now to FIG. 7A, the time interval t0–t1 is examined where switches QA, QD and QE are on, while switches QB, QC and QF are off. The following parameter values are observed.

V1=Vin
V2=nVo
V4=0
V1,2=V2,3=Vin−nVo
VA=VD=VE=0
VB=V2−V2,3=2nVo−Vin
VC=Vin
VF=Vin/2

During this interval, the input current through inductor L and the primary winding of transformer T linearly increases with time according to the relationship iL=LdV12/dt. During this switching cycle, energy from the input is transmitted to the output load through transformer T, while input energy is also stored in inductor L. Current is from the secondary side of transformer T increases during this interval, as does current ip flowing through the primary side of the inductor, as illustrated in the waveforms in FIG. 6. Also during this interval, as secondary side current is increases, the discharge current ic through output capacitor Co decreases. Once current is equals output current Io, capacitor Co begins to charge with current is, and the output current is supplied totally from secondary side current is.

Referring to FIG. 6, at time interval t1, switch QD turns off and switch QF turns on. At this point, the voltage across inductor L reverses polarity to obtain a continuity of current and magnetic flux through inductor L. This switching state is illustrated in circuit 71 of FIG. 7B. In this state, switches QA, QE and QF are on, while switches QB, QC and QD are off. In this instance, inductor L and the input power source transfer energy to transformer T to supply energy to the output load. In this state, inductor L releases energy stored in inductor L, and the current through inductor L and the primary side of transformer T decreases continuously. During this interval, input current also decreases from half of ipmax. Additional current is recycled from capacitor C1, which is switched into a completed circuit through switches QA, QE and QF to deliver energy to the primary side of transformer T. The values for the node voltages and voltages across the switches are given as follows.

V1=Vin
V2=nVo+Vin/2
V4=Vin/2
V1,2=V2,3=Vin−(nVo+Vin/2)=−(nVo−Vin/2)
VA=VE=VF=0
VB=V−V2,3=(nVo+Vin/2)+(nVo−Vin/2)=2nVo

VC=VD=Vin/2

The next switching sequence that occurs at time t2 shown in FIG. 6 provides for switches QA and QE to turn off, while switches QB and QC turn on. This state is illustrated in circuit 72 of FIG. 7C. The node voltages and voltages across the switches are given as follows.

V1=V1,3=2(Vin−nVo)
V2=V2,3=V1,2=Vin−nVo
V3=0
V4=Vin
VA=Vin−V1=2nVo−Vin
VB=VC=VF=0
VD=Vin
VE=Vin/2

During this period, the current through the primary side of transformer T and through inductor L flows in an opposite direction to that previously. Conducting switch QB provides a path for the current through inductor L and the primary side of transformer T. The magnitude of current ip through the primary side of transformer T increases linearly in the direction opposite to that of the first two switching stages described above. At the beginning of the interval with the configuration illustrated in circuit 72, current ip equals ipmin while at the end of the interval current ip equals ipmax. This configuration of circuit 72 permits bi-directional power to be transferred to the load, while also storing energy in inductor L as current through inductor L increases with the increase in current ip. Note also that capacitors C1 and C2 are being charged from the input power source.

The next switching stage in the operation of the converter begins at time period t3 illustrated in FIG. 6 with switches QB, QE and QF turning on, while switches QA, QC and QD are turned off. In this state, current ip through the primary side of transformer T decreases linearly from ipmax to ipmin over the course of the interval T3, T4. The node voltages and voltages across the switches are given as follows.

V1=V1,3=2V2,3=Vin−2nVo
V2=V2,3=Vin/2−nVo
V3=0
V4=Vin/2
VA=Vin−V1=2nVo
VB=VE=VF=0
VC=VD=Vin/2

Figure 7D:
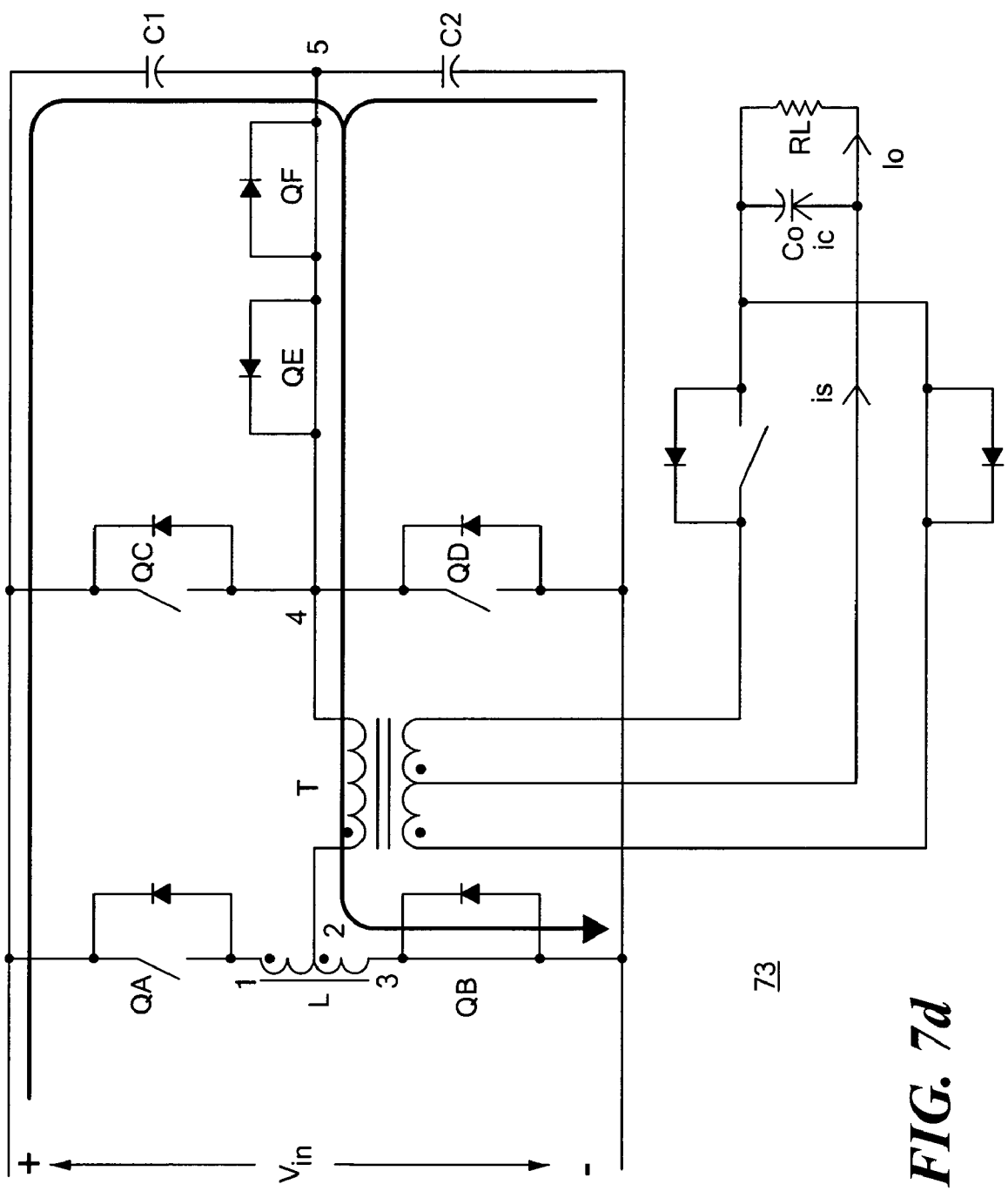

During this stage, illustrated in circuit 73 of FIG. 7D, the primary side of transformer T is provided with energy from the input power source as well as capacitor C2. During this interval, inductor L is discharging stored energy and forms a closed loop recycling circuit through switch QB in conjunction with capacitor C2. At the end of this interval where circuit 73 is in the state as shown, operation of the circuit reverts to the initial stage shown in FIG. 7A with the configuration of circuit 70.

According to the above embodiment, the operation of the converter according to the present invention calls for the input voltage to be less than or equal to twice the voltage on the primary side of transformer T. This result is seen by examining the voltage across either switch QB or QA when those switches are not conducting, and obtaining a voltage that is greater than or equal to zero. That is, 2Vp−Vin is greater than or equal to zero. Other types of configurations and techniques can be used to increase the relative range of the input voltage. For example, the converter may operate with no deadtime in one stage, and as a current-fed half bridge with deadtime in another stage. If the input voltage is greater than two times the minimum input voltage, the converter can operate as a conventional current-fed half bridge converter that consists of switches QA, QB, capacitor C1, C2, inductor L and transformer T. In this mode of operation, switches QC and QD are off, switches QE and QF are on for the entire interval of the current-fed half bridge mode and switches QA and QB are controlled by pulse trains that are 180° out of phase, with a duty ratio of greater than 50%.

The voltage and current of the primary winding of the converter according to the present invention are determined by load voltage and inductance of inductor L. The voltage across the secondary side of transformer T is constant and depends upon output load voltage. Accordingly, a housekeeping power supply with constant voltage can be easily achieved, which lends itself to the use of self driven synchronous rectifiers on the secondary side or power output stage. The self driven synchronous rectifiers can improve the efficiency of the converter when used in high current applications. It is also possible to optimize the driving voltage of the self driven synchronous rectifiers on the secondary side of the converter to decrease the power loss in the synchronous rectification MOSFETS.

An analysis of the present invention in comparison to the conventional current-fed full bridge DC-DC converter reveals a number of advantages provided by the converter according to the present invention. Table 1 below supplies the equations for circuit operation during steady state operation. The symbols in the equation represent the following values.

| | |
|---|---|
| Vin (Vin max:Vin min = 2:1) | Input voltage |
| Vo | Output voltage |
| RL | Output load |
| Po | Output power |
| Co | Output capacitance |
| T | Complete operation |
| To = T/2 | |
| $\Delta I_{Lpp}$ | Input inductor peak to peak ripple current |
| $\Delta V_{opp}$ | Peak to peak output ripple voltage |
| Lc | Critical inductance |
| DoTo | Time interval for current increase through the inductor |

The critical inductance Lc is defined as the minimum inductance used to keep the inductor current continuous at a 10% rating output power.

TABLE 1

$$\tilde{V}_o = \frac{V_{in}}{n} \frac{1+D_o}{2} \qquad V_{o,F} = \frac{V_{in}}{2n} \frac{1}{1-D_o}$$

$$\Delta \tilde{i}_{L,pp,max} = \Delta \tilde{i}_{L,pp}\big|_{D_o=\sqrt{2}-1} = 0.172 \frac{nV_oT_o}{L_N} \qquad \Delta i_{L,pp,F,max} = \Delta i_{L,pp,F}\big|_{D_o=\frac{1}{2}} = 0.5 \frac{nV_oT_o}{L_F}$$

$$\Delta \tilde{V}_{o,pp} = \frac{n^2V_o^2T_0^2}{8L_NC_o} \frac{D_0(1-D_0)}{1+D_0} \qquad \Delta V_{o,pp,F} = \frac{V_o}{R_LC_o} D_oT_o$$

$$\tilde{L}_{c,max} = \tilde{L}_c\big|_{D_o=\sqrt{2}-1} = 0.0858 \frac{n^2V_o^2T_0}{P_o} \qquad L_{c,F,max} = L_{c,F}\big|_{D_o=\frac{1}{3}} = 0.296 \frac{n^2V_o^2T_0}{P_o}$$

Figure 9:
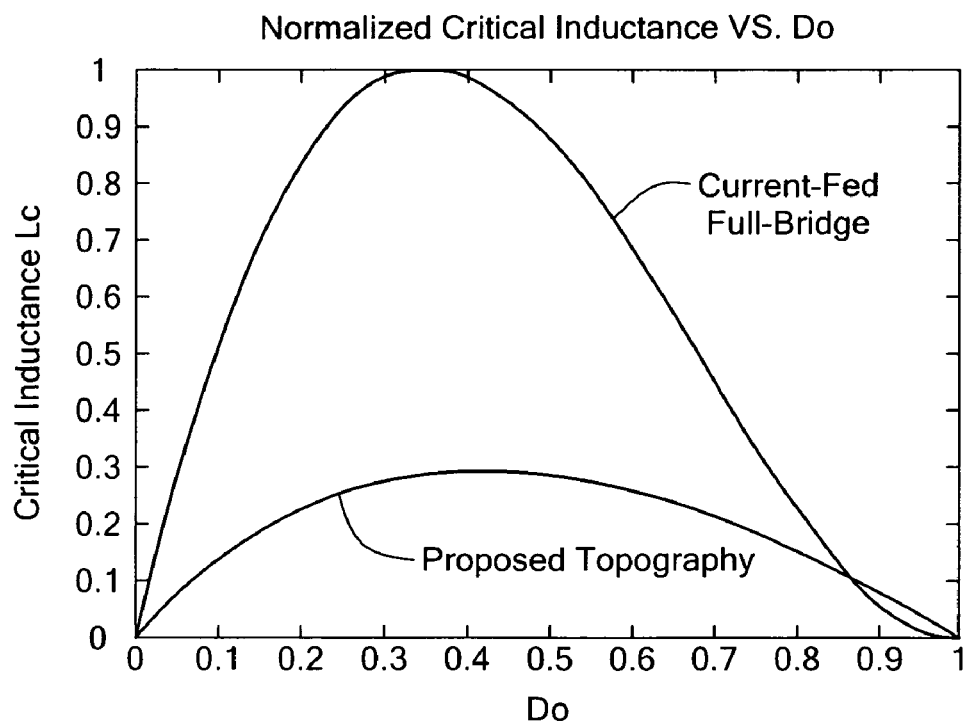
FIG. 9 is a graph illustrating normalized critical inductance for a conventional converter and a converter according to the present invention.

From table 1, output voltage Vo for the full bridge circuit has a RHP zero, and Vo for the converter according to the present invention is linear with Do. Critical inductance Lc is different for the different topologies, as illustrated in the graph in FIG. 9. The maximum critical inductance Lc for the converter according to the present invention occurs at Do=0.414, while for the conventional converter inductance Lc occurs at Do=0.333. The ratio of the maximum critical inductance Lc between the two converters is 3.5, indicating that operation in continuous conduction mode at the same minimum output current produces a critical inductance in the conventional converter that is 3.5 times as great as that of the converter according to the present invention. Similarly, the present invention provides a transient response speed that is approximately 3.5 times faster than that of the conventional converter. The inductor used in the converter according to the present invention also has a much smaller magnetic core size than that of the conventional converter, leading to space savings in the present invention.

Figure 8:
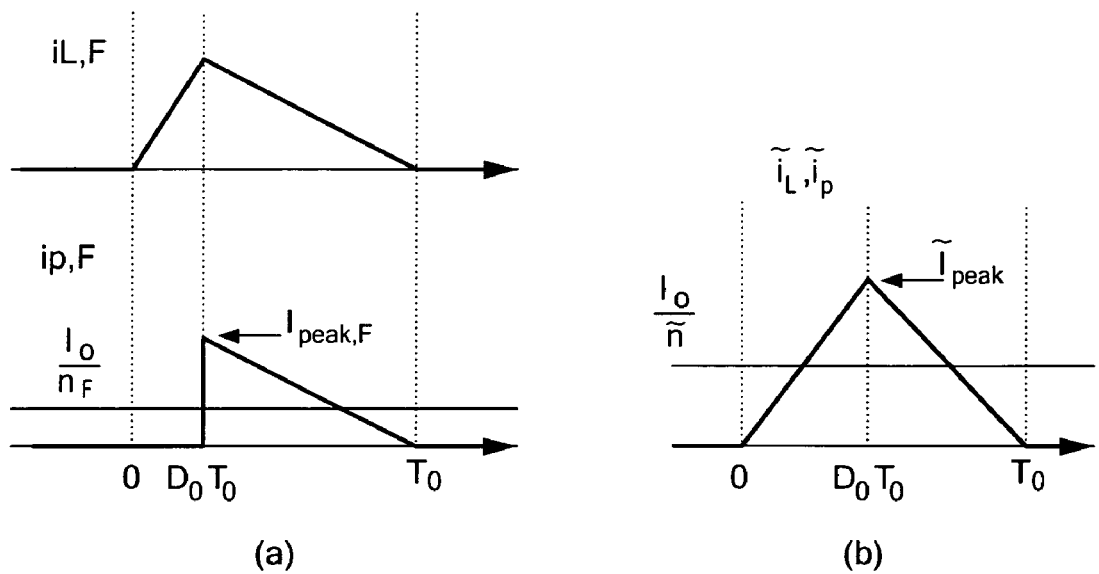
FIG. 8 is a set of graphs illustrating current waveforms for a conventional DC-DC converter and the converter according to the present invention.

Referring now to FIG. 8, inductor and primary winding currents for the conventional and inventive converter are illustrated. In the conventional converter, the primary winding current is zero over the interval of $0 < T \leq D_oT_o$. Over the interval of $D_oT_o < T \leq T_o$, the primary winding current is the same as the inductor current. In accordance with the present invention, the primary winding current and the inductor winding current are the same over the entire interval of To. Accordingly, an average output current Io provided to the load can be maintained with a peak inductor current of ipeak=2Io/n(1−Do) in the conventional converter. In the converter according to the present invention, the peak inductor current is ipeak=2Io/n. Since the number of turns in the inductor used in the present invention is half the number used in the conventional converter, the peak current in the conventional converter is less than or equal to the peak current in the present invention, meaning that the conventional converter uses a larger inductance.

Figure 10:
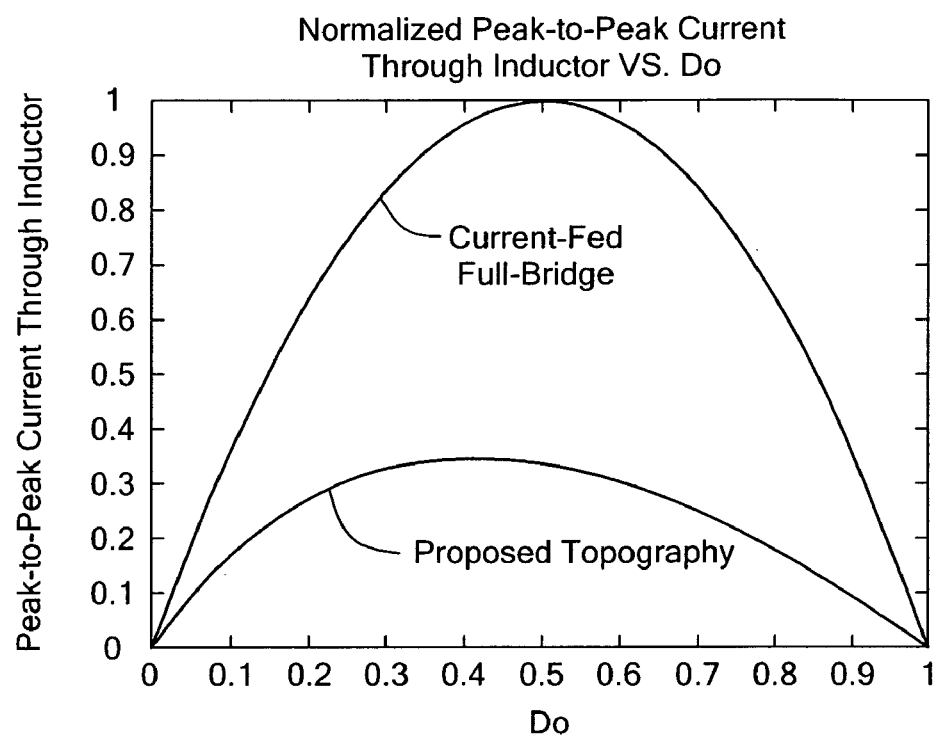
FIG. 10 is a graph illustrating normalized peak to peak inductor current for a conventional converter and a converter according to the present invention.

Referring now to FIG. 10, a graph illustrating normalized curves with the relation of the peak to peak ripple current through the inductor to Do is shown. The range of Do for the conventional converter is approximately 0-0.5 in the instance where there is a 2:1 input voltage range, while Do for the inventive converter has a corresponding range of 0-1. If these two different converters use the same value of inductance, the ripple current through the conventional converter is approximately three times larger than that of the inventive converter. Due to the existence of the deadtime in the conventional converter, load current is maintained by the output capacitor during deadtime.

Figure 11:
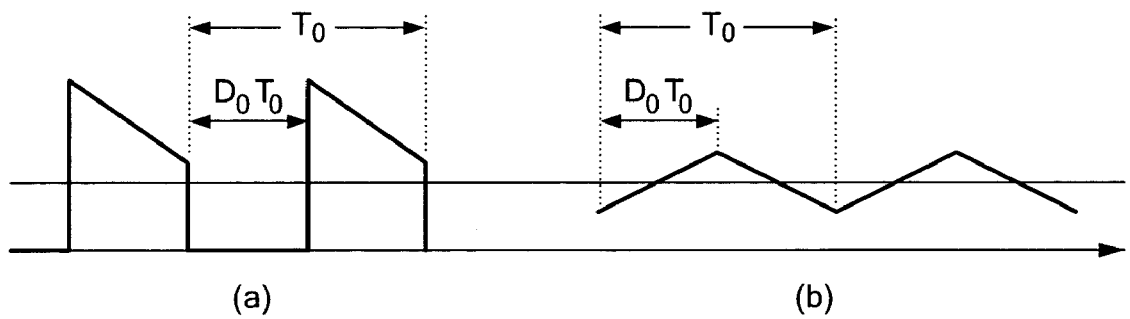
FIG. 11 is a comparative graph illustrating current waveforms between a conventional converter and a converter according to the present invention.

Referring to FIG. 11, the current waveforms of the rectifier outputs for the conventional converter and the inventive converter are illustrated. It can readily be observed that the peak current of the conventional converter is greater than that of the converter according to the present invention.

In addition, over the time interval DoTo, capacitor Co provides the majority of energy output to the load from either of the converters. As can be observed from the graphs in FIG. 11, the present invention permits a smaller capacitance to be used for the output capacitor under the same output voltage ripple specifications.

The present invention provides a new topology for an isolated current-fed DC-DC converter that includes a small inductor and no deadtime operation. The small inductor permits a fast transient response speed and does not exhibit the characteristics of an RHP zero as is typically noted in conventional converters. The converter according to the present invention also has a smaller input ripple current in comparison with conventional fly back, current-fed, push-pull topologies, and overcomes the start up problems that can occur in current-fed full bridge converters.

The invention is not to be limited by the embodiments which have been shown and described and is intended to embrace the full spirit and scope of the appended claims.

What is claimed is:

1. A DC-DC power converter, comprising:
   a switching stage including at least two switches arranged in a half-bridge configuration for switching an input power signal to a load;
   an energy storage device coupled between the at least two switches for contributing to transfer of energy to an output;
   an energy transfer device coupled to the energy storage device for transferring energy to the output; and
   the at least two switches being configured to cooperatively switch to operate the energy storage device in a continuous current conduction mode.

2. The converter according to claim 1, wherein the switching stage includes four switches arranged in two half-bridge configurations, the energy transfer device being coupled to the common node of at least one of the half-bridges.

3. The converter according to claim 2, further comprising a recycling switch coupled to the energy transfer device for recycling stored energy to the energy transfer device.

4. The converter according to claim 3, wherein the recycling switch is bi-directional.

5. The converter according to claim 3, wherein the recycling switch includes two MOSFETS.

6. The converter according to claim 3, further comprising another energy storage device coupled to the recycling switch to supply stored energy to the energy transfer device through the recycling switch.

7. The converter according to claim 6, wherein the another energy storage device is a capacitor.

8. The converter according to claim 6, wherein the another energy storage device further comprises two capacitors, and the recycling switch is coupled to a common node of the capacitors.

9. The converter according to claim 1, further comprising an output stage coupled to the energy transfer device for outputting DC power.

10. The converter according to claim 9, wherein the output stage includes a self-driven synchronous rectifier.

11. The converter according to claim 1, wherein the energy storage device is an inductor.

12. The converter according to claim 11, wherein the energy transfer device is coupled to the inductor through a center tap of the inductor.

13. The converter according to claim 1, wherein the energy transfer device is a transformer.

14. A method of operating a DC-DC power converter having an inductor coupled between two switches arranged in a half-bridge configuration, comprising:
   switching one of the two switches on to permit current flow through the inductor;
   switching another of the two switches on while the one switch is on to provide continuous current conduction through the inductor; and
   switching the one switch off while the another switch is on, thereby operating the inductor in continuous current conduction mode without deadtime.

15. The method according to claim 14, further comprising recycling energy through a capacitor half bridge to contribute to providing continuous output current to a load.

16. A method of operating a DC-DC power converter having a full bridge type topology with an inductor coupled between switches in one half of the full-bridge, comprising:
   operating the switches in the full-bridge type topology with relatively low voltage to permit the converter to appear as a full-bridge type converter with the inductor operating in continuous current conduction mode and no deadtime; and
   operating the switches in the full-bridge type topology with relatively high input voltage to permit the converter to appear as a half-bridge type converter with the inductor operated with deadtime.

17. A DC-DC power converter, comprising:
   a switching stage including at least two switches arranged in a half-bridge configuration for switching an input power signal to a load;
   an energy storage device coupled between the at least two switches for contributing to transfer of energy to an output;
   an energy transfer device, coupled to the energy storage device for transferring energy to the output; and
   the at least two switches being configured to cooperatively switch to operate the energy storage device to provide a continuous, non-zero current.

18. A DC-DC power converter, comprising:
   a switching stage including at least two switches arranged in a half-bridge configuration for switching an input power signal to a load;
   an energy storage device coupled between the at least two switches for contributing to transfer of energy to an output;
   an energy transfer device coupled to the energy storage device for transferring energy to the output; and
   the at least two switches being adapted to operate so that current in a primary side of the energy transfer device is equal to current through the energy storage device.

* * * * *

UNITED STATES PATENT AND TRADEMARK OFFICE
CERTIFICATE OF CORRECTION

PATENT NO. : 7,272,020 B2  Page 1 of 1
APPLICATION NO. : 11/063248
DATED : September 18, 2007
INVENTOR(S) : Bradley M. Lehman et al.

It is certified that error appears in the above-identified patent and that said Letters Patent is hereby corrected as shown below:

Column 5, line 67, "VB=V-V2,3=(nVo+Vin/2)+(nVo-Vin/2)=2nVo" should read --VB=V2-V2,3=(nVo+Vin/2)+(nVo-Vin/2)=2nVo--.

Signed and Sealed this

Twenty-fifth Day of March, 2008

JON W. DUDAS
*Director of the United States Patent and Trademark Office*